(12) United States Patent
Bergerhoff et al.

(10) Patent No.: US 6,681,164 B2
(45) Date of Patent: Jan. 20, 2004

(54) SYSTEM AND METHOD FOR MONITORING THE WHEELS OF A MOTOR VEHICLE

(75) Inventors: Nikolas Bergerhoff, Regensburg (DE); Martin Fischer, Regensberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/279,463

(22) Filed: Oct. 24, 2002

(65) Prior Publication Data

US 2003/0093198 A1 May 15, 2003

(30) Foreign Application Priority Data

Oct. 24, 2001 (DE) .......................... 101 52 340

(51) Int. Cl.$^7$ .............................. B60C 23/00; B60Q 1/00
(52) U.S. Cl. .............................. 701/36; 701/29; 701/43; 34/442; 34/447; 73/146.2
(58) Field of Search ............................. 701/36, 29, 24, 701/30, 43, 45; 340/447, 445, 10.6, 870.28, 425.5, 539; 73/146.5, 146.2

(56) References Cited

U.S. PATENT DOCUMENTS

| 6,011,463 | A | * | 1/2000 | Cormier, Sr. | ............... 340/447 |
| 6,169,480 | B1 | * | 1/2001 | Uhl et al. | .................... 340/442 |
| 6,448,891 | B2 | * | 9/2002 | Barnett | ........................ 340/438 |
| 6,448,892 | B1 | * | 9/2002 | Delaporte | ................... 340/442 |
| 6,476,712 | B1 | * | 11/2002 | Achterholt | .................. 340/447 |

FOREIGN PATENT DOCUMENTS

| DE | 38 84 506 T2 | 5/1994 | ........... B60C/23/02 |
| DE | 197 20 123 C2 | 3/2001 | ............ H02J/13/00 |
| DE | 100 14 076 A1 | 10/2001 | ........... B60C/23/02 |
| EP | 0 806 370 B1 | 4/1997 | ........... B65D/43/10 |

* cited by examiner

Primary Examiner—Thomas G. Black
Assistant Examiner—Arthur D. Donnelly
(74) Attorney, Agent, or Firm—Baker Botts L.L.P.

(57) ABSTRACT

The invention relates to a system for monitoring the wheels (R1, R2, R3, R4) of a motor vehicle (10) for fault states, in particular for incorrect tire pressures, each wheel (R1, R2, R3, R4) to be monitored being assigned a wheel unit (E1, E2, E3, E4) which, after the reception of a trigger signal (TR), supplies data (D1, D2, D3, D4) which is suitable for detecting a fault state and/or for determining the wheel position (FL, FR, RL, RR) of at least one wheel (R1, R2, R3, R4). There is provision for a portable transmitter (12) which can be included with which a trigger signal (TR), in particular a radio-frequency trigger signal, can be generated for at least one wheel unit (E1, E2, E3, E4).

28 Claims, 2 Drawing Sheets

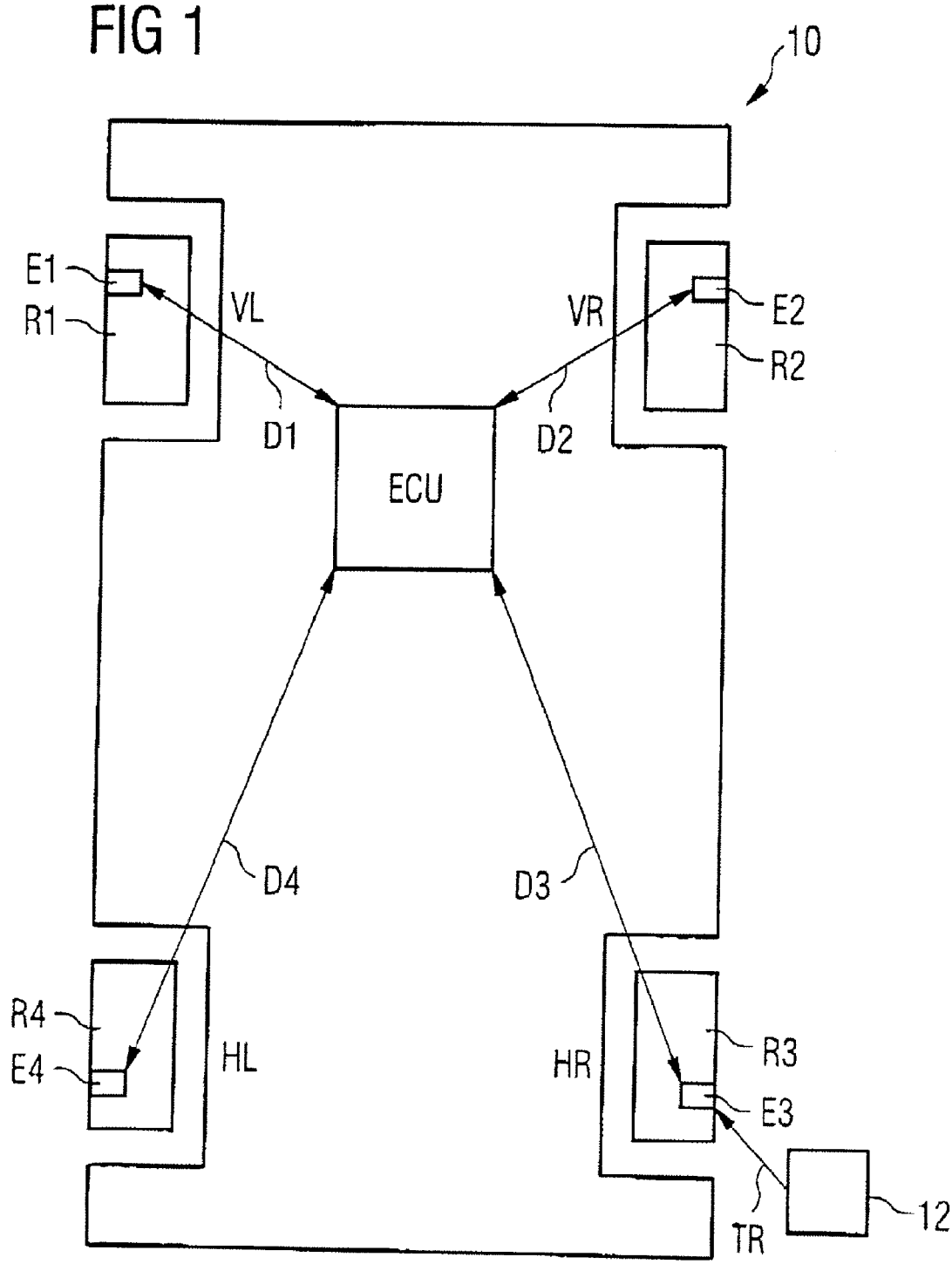

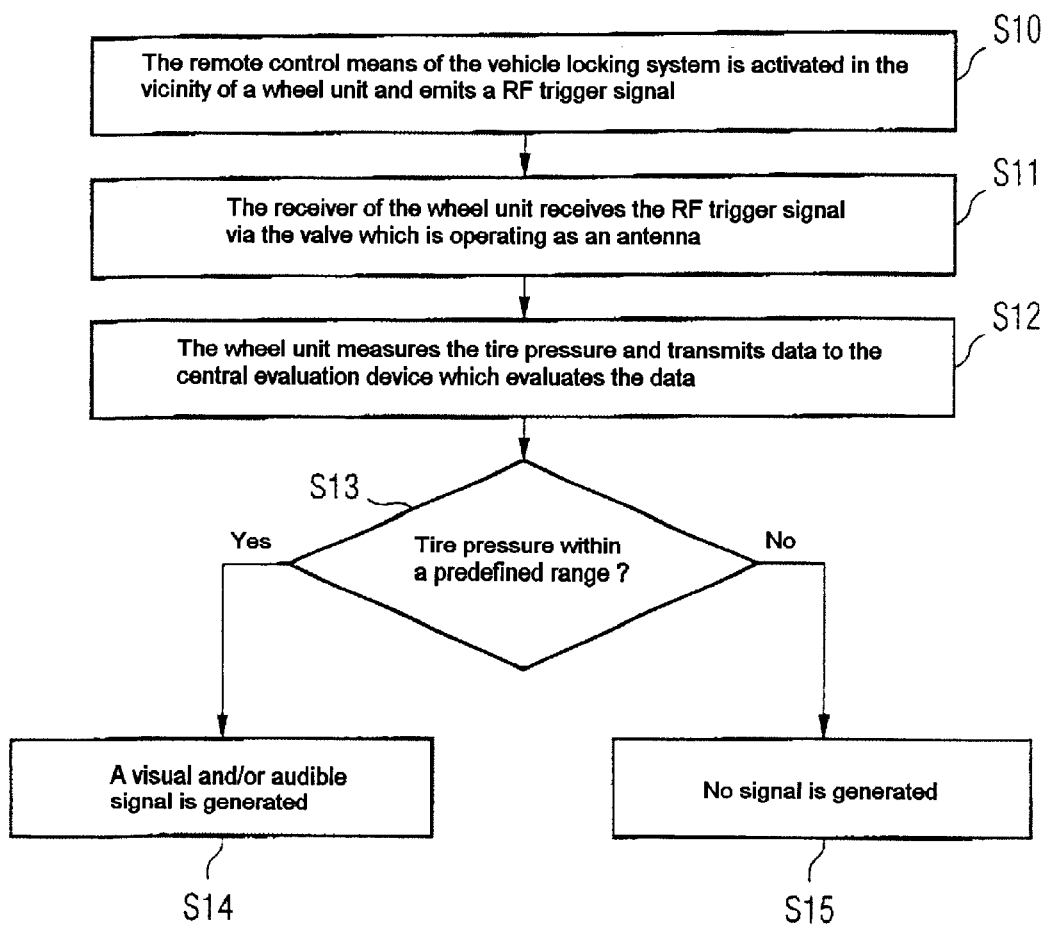

SYSTEM AND METHOD FOR MONITORING THE WHEELS OF A MOTOR VEHICLE

BACKGROUND OF THE INVENTION

The invention relates to a system and a method for monitoring the wheels of a motor vehicle for fault states, in particular for incorrect tire pressures, each wheel to be monitored being assigned a wheel unit which, after the reception of a trigger signal, supplies data which is suitable for detecting a fault state and/or for determining the wheel position of at least one wheel.

The term fault state is to be understood in a wide sense in the present context and comprises all states which are considered as worthy of detection.

With respect to the systems and methods of the generic type, it is known, for example, that the wheel units transmit information, by means of radio-frequency signals, to a central evaluation device which is arranged on the chassis of the motor vehicle. Wheel unit is to be understood in the present context as any wheel unit which rotates with a respective wheel and is suitable for supplying information or data which can be used to detect fault states which possibly occur at the wheel. In addition to the actual detection of a fault state, in many systems and methods of the generic type there is provision for the wheel position (for example front left, front right, rear left, rear right) of the individual wheels to be determined so that, when a fault state occurs, the fault state can be indicated together with the respective wheel position.

For example, EP 0 806 307 B1 has already disclosed a method for carrying out the assignment of the wheel position to air pressure monitoring devices in an air pressure monitoring system of a motor vehicle, the motor vehicle having, inter alia, the following components: a number of wheels, each wheel being assigned an air pressure monitoring device which is capable of transmitting an individual identifier to a central processor unit, and a central processor unit in which the assignment of the identifier to an air pressure monitoring device relating to the wheel position for each wheel is stored. In the method known from EP 0 806 307 B1, the assignment of the air pressure monitoring device to the wheel positions is performed as follows: an assignment mode is switched on; the individual identifiers of the air pressure monitoring device are output; the central processor unit evaluates which individual identifier has been transmitted from which wheel position; the assignment which is determined in the central processor unit is stored; and the assignment mode is switched off and the air pressure monitoring system is operated in a pressure monitoring mode. In order to evaluate the individual identifiers, there is, in particular, provision here for a specific variable, for example the wheel speed, for each wheel of the motor vehicle to be measured both with a wheel unit of the air pressure monitoring device and with a fixed sensor with a known wheel position. Then, the wheel position of the individual wheels is determined by comparing the output signals of the fixed sensors and the output signals of the wheel units.

DE 197 20 123 C2 also discloses that a separate antenna is to be provided in the region of each wheel to be monitored, which antenna can be used to receive signals emitted by the wheel units. Although each of the antennas can, under certain circumstances, also receive signals from wheel units which are not arranged directly adjacent to the respective antenna, according to the teaching of DE 197 20 123 C2 it is sufficient, for determining the wheel positions of the individual wheels, to assume that a signal which is emitted and received by a directly adjacent wheel unit has a higher signal level than a signal which is received by a more remotely arranged wheel unit.

The known systems and methods have in common the fact that they are very complex and therefore expensive in terms of the necessary hardware and software.

SUMMARY OF THE INVENTION

The invention is based on the object of developing the systems and methods of the generic type in such a way that the necessary hardware and software is reduced.

This object is achieved by a system for monitoring the wheels of a motor vehicle for fault states, wherein each wheel to be monitored being assigned a wheel unit which, after the reception of a trigger signal supplies data which is suitable for detecting a fault state and/or for determining the wheel position of at least one wheel, the system comprising a portable transmitter with which a trigger signal, in particular a radio-frequency trigger signal, can be generated for at least one wheel unit, wherein in order to determine the wheel position of a wheel, the triggered wheel unit transmits an identifier to a central evaluation device of the vehicle, which simultaneously receives the trigger signal which is emitted by the portable transmitter and is assigned to a specific wheel position.

The portable transmitter can be also provided for the remote control of a motor vehicle locking system. The trigger signal can be fed to the wheel units when the motor vehicle locking system is remote-controlled. The trigger signal can also be fed to the wheel units when a specific pushbutton key and/or a specific pushbutton key combination of pushbutton keys of the remote control means of the motor vehicle locking system is activated. Each wheel unit may have a receiver with which trigger signals which are emitted by the portable transmitter can be received. The sensitivity of the receivers and the transmitting power of the portable transmitter can be matched to one another in such a way that the portable transmitter has to be activated in the vicinity of a wheel unit in order to generate a trigger signal for this wheel unit. The wheel units may be arranged at least partially in the region of the valves of the wheels. The wheel units can have antennas which are formed at least partially by the valves of the wheels. The wheel units may transmit the data at least partially to a central evaluation device of the motor vehicle. The data which can be transmitted to the central evaluation device of the motor vehicle permits the wheel position of at least one wheel to be determined. The data which is transmitted to the central evaluation device of the motor vehicle may permits a fault state to be detected. The wheel units can have devices for evaluating the data. The wheel units may have devices for indicating a fault state.

A method for monitoring the wheels of a motor vehicle for fault states, each wheel to be monitored being assigned a wheel unit which, comprises the steps of: after the reception of a trigger signal supplying data which is suitable for detecting a fault state and/or for determining the wheel position of at least one wheel, the trigger signal, in particular a radio-frequency trigger signal, being generated by a portable transmitter, wherein in order to determine the wheel position of a wheel, the triggered wheel unit transmits an identifier to a central evaluation device of the vehicle which simultaneously receives the trigger signal which is emitted by the portable transmitter and is assigned to a specific wheel position.

The portable transmitter may also provided for remote-controlling a motor vehicle locking system. The trigger signal may be fed to the wheel units when the motor vehicle locking system is remote-controlled. The trigger signal may also be fed to the wheel units if a specific pushbutton key and/or a specific pushbutton combination of pushbutton keys of the remote control means of the motor vehicle locking system is activated. Each wheel unit can have a receiver with which signals which are emitted by the portable transmitter are received. The sensitivity of the receivers and the transmitting power of the portable transmitter can be adjusted to one another in such a way that the portable transmitter has to be activated in the vicinity of a wheel unit in order to generate a trigger signal for this wheel unit. The wheel units can be arranged at least partially in the region of the valves of the wheels. The wheel units may have antennas which are formed at least partially by the valves of the wheels. The wheel units can transmit the data at least partially to a central evaluation device of the motor vehicle. The data which can be transmitted to the central evaluation device of the motor vehicle permits the wheel position of at least one wheel to be determined. The data which is transmitted to the central evaluation device of the motor vehicle can permit a fault state to be detected. The wheel units can at least partially evaluate the data. The wheel units may further indicate a fault state. The fault state can include and incorrect tire pressures. The trigger signal can be a radio-frequency trigger signal.

The system according to the invention is based on the prior art of the generic type in that it comprises a portable transmitter with which a trigger signal, in particular a radio-frequency trigger signal, can be generated for at least one wheel unit. In response to the trigger signal which is generated by the portable transmitter, it is possible for one or more wheel units to supply data which is suitable exclusively for determining one or more wheel positions which are suitable only for detecting a fault state or which are suitable both for determining one or more wheel positions and for detecting fault states. If the wheel units have devices for evaluating the data and for indicating a fault state, the system according to the invention is suitable in particular for retrofitting a motor vehicle. This applies in particular if the wheel units are combined at least partially with the valves of the wheels. For example, it is possible for the wheel units to check the tire pressure in response to the trigger signal generated by the portable transmitter, and to generate a visual signal in the case of a correct tire pressure, while they indicate a fault state by the fact that no visual signal is generated.

In one preferred development of the system according to the invention, there is provision for the portable transmitter also to be provided for the remote control of a motor vehicle locking system. As modem vehicles are generally equipped with a motor vehicle locking system which can be remote-controlled, this solution has the advantage that the driver does not have to carry additional objects on his person.

In the present context, it is also possible to provide in the system according to the invention that the trigger signal is fed to the wheel units when the motor vehicle locking system is remote-controlled. This embodiment is particularly considered when a trigger signal is to be fed to all the wheel units simultaneously, for example in order to monitor all the tire pressures on a routine basis before starting a journey. In such a context, a spare wheel which is generally provided can also, if appropriate, be monitored for fault states.

Alternatively, in the system according to the invention, it is possible to provide that the trigger signal is fed to the wheel units if a specific pushbutton key and/or a specific pushbutton key combination of pushbutton keys of the remote control means of the motor vehicle locking system is activated. This solution is considered in particular if in each case a trigger signal is to be fed to just one of the wheel units, for example in order to carry out the determination of the wheel position. This procedure can also be advantageous if the system according to the invention is a system which is provided for retrofitting, in particular a system provided for retrofitting in which the wheel units themselves carry out the evaluation of the data for fault states and the indication of a possible fault state.

In preferred embodiments of the system according to the invention, there is provision for each wheel unit to have a receiver with which trigger signals which are emitted by the portable transmitter can be received. Such embodiments also prove particularly advantageous if the system according to the invention is provided for retrofitting.

In the present context, there is also preferably provision in the system according to the invention that the sensitivity of the receivers and the transmitting power of the portable transmitter are matched to one another in such a way that the portable transmitter has to be activated in the vicinity of a wheel unit in order to generate a trigger signal for this wheel unit. Here, it is possible, for example in order to determine the wheel positions, for the portable transmitter to have a separate pushbutton key for each wheel position. In this case, the triggered wheel unit can, for example, transmit an identifier to a central evaluation device of the vehicle. At the same time, the central evaluation device receives the trigger signal which is emitted by the portable transmitter and is assigned to a specific wheel position.

In one advantageous development of the system according to the invention, there is provision for the wheel units to be arranged at least partially in the region of the valves of the wheels. Here, it is considered particularly advantageous if conventional valves can be replaced by valves which comprise a wheel unit.

In conjunction with the system according to the invention, it is also possible to provide for the wheel units to have antennas which are formed at least partially by the valves of the wheels. The antennas can be provided here both for receiving signals of the portable transmitter and/or a central evaluation device and for transmitting signals to a central evaluation device, for example.

In specific embodiments of the system according to the invention, it is considered advantageous if there is provision for the wheel units to transmit the data at least partially to a central evaluation device of the motor vehicle. The data is preferably transmitted here by means of radio-frequency signals.

In the present context, it is possible that the system according to the invention also provides for the data which is transmitted to the central evaluation device of the vehicle to permit the wheel position of at least one wheel to be determined. Here, solutions are possible in which one wheel unit after the other is triggered by the portable transmitter as well as solutions in which all the wheel units are triggered jointly by a single activation of the portable transmitter.

In addition or alternatively, it is possible to provide in the system according to the invention for the data which is transmitted to the central evaluation device of the motor vehicle to permit a fault state to be detected. This does not exclude the possibility of the wheel units additionally also being triggered by other devices, in particular by the central evaluation device itself, during the driving mode, for example.

The system according to the invention also comprises embodiments in which there is provision for the wheel units to have devices for evaluating the data. Such embodiments are advantageous, in particular, in systems which are provided for retrofitting.

In particular in the context explained above, there is also preferably provision in the system according to the invention for the wheel units to have devices for indicating a fault state. In order to be able to detect a failure of a wheel unit, it is considered advantageous that a fault state is indicated by generating no signal, while a signal is generated for confirmation in the fault-free state.

The method according to the invention is based on the prior art of the generic type in that the trigger signal, in particular a radio-frequency trigger signal, can be generated by a portable transmitter. As a result, the advantages explained in conjunction with the system according to the invention are obtained in an identical or similar way, for which reason reference is made to the corresponding statements in order to avoid repetitions.

The same applies accordingly for the following preferred embodiments of the method according to the invention, reference also being made to the corresponding embodiments of the system according to the invention with respect to the advantages which can be achieved by means of these embodiments.

In preferred embodiments of the method according to the invention, there is provision for the portable transmitter also to be provided for remote-controlling a motor vehicle locking system.

In this context it is also possible to provide for the trigger signal to be fed to the wheel units when the motor vehicle locking system is remote-controlled.

Alternatively, in the method according to the invention, it is possible to provide for the trigger signal to be fed to the wheel units when a specific pushbutton key and/or a specific pushbutton combination of pushbutton keys of the remote control of the motor vehicle locking system is activated.

In preferred embodiments of the method according to the invention there is provision for each wheel unit to have a receiver with which signals which are emitted by the portable transmitter are received.

It is also possible to provide in this context for the sensitivity of the receivers and the transmitting power of the portable, transmitter to be matched to one another in such a way that the portable transmitter has to be activated in the vicinity of a wheel unit in order to generate a trigger signal for this wheel unit.

In preferred embodiments of the method according to the invention, there is also provision for the wheel units to be arranged at least partially in the region of the valves of the wheels.

Furthermore, in the method according to the invention, it is also possible to provide for the wheel units to have antennas which are formed at least partially by the valves of the wheels.

Similarly to the system according to the invention, it is also possible to provide in the method according to the invention for the wheel units to transmit the data at least partially to a central evaluation device of the motor vehicle.

In this context, it is also possible to provide for the data which is transmitted to the central evaluation device of the motor vehicle to permit the wheel position of at least one wheel to be determined.

In addition or alternatively, it is possible that the method according to the invention provides for the data which is transmitted to the central evaluation device of the motor vehicle to permit a fault state to be detected.

Furthermore, the method according to the invention can provide for the wheel units to at least partially evaluate the data.

In particular, in this context, embodiments are possible which provide for the wheel units to indicate a fault state.

Any system which is suitable for carrying out an embodiment of the method according to the invention falls within the scope of protection of the associated claims.

BRIEF DESCRIPTION OF THE DRAWINGS

The invention will now be explained by way of example by means of preferred embodiments and with reference to the appended drawings, in which:

FIG. 1 shows a schematic block diagram of a motor vehicle which has an embodiment of the system according to the invention; and FIG. 2 shows a flowchart which illustrates an embodiment of the method according to the invention.

DETAILED DESCRIPTION OF THE PREFERRED EMBODIMENTS

FIG. 1 shows a schematic block circuit diagram of a motor vehicle which has an embodiment of the system according to the invention. Here, the entire motor vehicle is provided with the reference symbol 10. The motor vehicle 10 has four wheels R1, R2, R3, R4. Each of the wheels R1, R2, R3, R4 is assigned a wheel unit E1, E2, E3, E4 which can be arranged, for example, in the tire and/or in the region of the valve of the respective wheel R1, R2, R3, R4. The wheel position front left is referred to as FL, the wheel position front right is referred to as FR, the wheel position rear left is referred to as RL and the wheel position rear right is referred to as RR. In the embodiment of the system according to the invention illustrated in FIG. 1, said system comprises a central evaluation device ECU. The central evaluation device ECU can exchange data D1, D2, D3, D4 with the respective wheel units E1, E2, E3, E4, preferably by means of radio frequency signals. A portable transmitter 12, which is formed by the remote control means of the motor vehicle locking system, is used in the illustrated case to feed a trigger signal TR to, in each case, just one directly adjacent wheel unit. In the illustrated case, the portable transmitter 12 is arranged adjacent to the wheel unit E3 or to the wheel R3 which is located at the rear right RR wheel position. In response to the trigger signal TR emitted by the portable transmitter 12, the wheel unit E3 transmits data D3 to the central evaluation device ECU. The central evaluation device ECU then checks the transmitted data D3 in order, for example, to detect an incorrect tire pressure as a fault state. As a result, the embodiment of the method according to the invention which is explained below with reference to FIG. 2 is carried out.

FIG. 2 shows a flowchart which illustrates an embodiment of the method according to the invention, the references which are used in the following explanation relating to FIG. 1. In step S10, the portable transmitter 12 or the remote control means of the vehicle locking system is activated in the vicinity of a wheel unit, for example the wheel unit E3, and emits a radio-frequency trigger signal TR. In the step S11, the receiver of the wheel unit E3 receives the radio-frequency trigger signal TR via the valve of the wheel R3 which operates as an antenna. In step S12, the wheel unit E3 measures the tire pressure and transmits data D3 to the central evaluation device ECU which evaluates the data D3. Then, in step S13 there is checking to determine whether the tire pressure of the wheel R3 is within a predefined range. If this is the case, the system branches to step S14 in which a visual and/or an audible signal is generated, for example via the indicator lights of the motor vehicle being turned on briefly. If it is detected in step S13 that the tire pressure of the wheel R3 does not lie within a predefined range, the system branches to step S15 in which no signal is generated. The fact that a fault state is indicated by the failure of a signal to occur makes it possible for even faulty wheel units to be detected in many cases. The method sequence explained above can be carried out successively for all the wheels R1, R2, R3, R4 of the motor vehicle.

The features of the invention which are disclosed in the present description, in the drawings and in the claims can be essential for the implementation of the invention, either individually or in any desired combination.

What is claimed is:

1. A system for monitoring the wheels of a motor vehicle for fault states, wherein each wheel to be monitored being assigned a wheel unit which, after the reception of a trigger signal supplies data which is suitable for detecting a fault state and/or for determining the wheel position of at least one wheel, the system comprising a portable transmitter with which a trigger signal, in particular a radio-frequency trigger signal, can be generated for at least one wheel unit, wherein in order to determine the wheel position of a wheel, the triggered wheel unit transmits an identifier to a central evaluation device of the vehicle, which simultaneously receives the trigger signal which is emitted by the portable transmitter and is assigned to a specific wheel position.

2. The system as claimed in claim 1, wherein the portable transmitter is also provided for the remote control of a motor vehicle locking system.

3. The system as claimed in claim 2, wherein the trigger signal is fed to the wheel units when the motor vehicle locking system is remote-controlled.

4. The system as claimed in claim 2, wherein the trigger signal is fed to the wheel units when a specific pushbutton key and/or a specific pushbutton key combination of pushbutton keys of the remote control means of the motor vehicle locking system is activated.

5. The system as claimed in claim 1, wherein each wheel unit has a receiver with which trigger signals which are emitted by the portable transmitter can be received.

6. The system as claimed in claim 5, wherein the sensitivity of the receivers and the transmitting power of the portable transmitter are matched to one another in such a way that the portable transmitter has to be activated in the vicinity of a wheel unit in order to generate a trigger signal for this wheel unit.

7. The system as claimed in claim 1, wherein the wheel units are arranged at least partially in the region of the valves of the wheels.

8. The system as claimed in claim 1, wherein the wheel units have antennas which are formed at least partially by the valves of the wheels.

9. The system as claimed in claim 1, wherein the wheel units transmit the data at least partially to a central evaluation device of the motor vehicle.

10. The system as claimed in claim 9, wherein the data which is transmitted to the central evaluation device of the motor vehicle permits the wheel position of at least one wheel to be determined.

11. The system as claimed in claim 9, wherein the data which is transmitted to the central evaluation device of the motor vehicle permits a fault state to be detected.

12. The system as claimed in claim 1, wherein the wheel units have devices for evaluating the data.

13. The system as claimed in claim 1, wherein the wheel units have devices for indicating a fault state.

14. A method for monitoring the wheels of a motor vehicle for fault states, each wheel to be monitored being assigned a wheel unit which, after the reception of a trigger signal supplies data which is suitable for detecting a fault state and/or for determining the wheel position of at least one wheel, the trigger signal, being generated by a portable transmitter, wherein in order to determine the wheel position of a wheel, the triggered wheel unit transmits an identifier to a central evaluation device of the vehicle which simultaneously receives the trigger signal which is emitted by the portable transmitter and is assigned to a specific wheel position.

15. The method as claimed in claim 14, wherein the portable transmitter is also provided for remote-controlling a motor vehicle locking system.

16. The method as claimed in claim 15, wherein the trigger signal is fed to the wheel units when the motor vehicle locking system is remote-controlled.

17. The method as claimed in claim 15, wherein the trigger signal is fed to the wheel units if a specific pushbutton key and/or a specific pushbutton combination of pushbutton keys of the remote control means of the motor vehicle locking system is activated.

18. The method as claimed in claim 14, wherein each wheel unit has a receiver with which signals which are emitted by the portable transmitter are received.

19. The method as claimed in claim 18, wherein the sensitivity of the receivers and the transmitting power of the portable transmitter are adjusted to one another in such a way that the portable transmitter has to be activated in the vicinity of a wheel unit in order to generate a trigger signal for this wheel unit.

20. The method as claimed in claim 14, wherein the wheel units are arranged at least partially in the region of the valves of the wheels.

21. The method as claimed in claim 14, wherein the wheel units have antennas which are formed at least partially by the valves of the wheels.

22. The method as claimed in claim 14, wherein the wheel units transmit the data at least partially to a central evaluation device of the motor vehicle.

23. The method as claimed in claim 22, wherein the data which is transmitted to the central evaluation device of the motor vehicle permits the wheel position of at least one wheel to be determined.

24. The method as claimed in claim 21, wherein the data which is transmitted to the central evaluation device of the motor vehicle permits a fault state to be detected.

25. The method as claimed in claim 14, wherein the wheel units at least partially evaluate the data.

26. The method as claimed in claim 14, wherein the wheel units indicate a fault state.

27. The method as claimed in claim 14, wherein the fault state includes and incorrect tire pressures.

28. The method as claimed in claim 14, wherein the trigger signal is a radio-frequency trigger signal.

* * * * *

UNITED STATES PATENT AND TRADEMARK OFFICE
CERTIFICATE OF CORRECTION

PATENT NO. : 6,681,164 B2
DATED : January 20, 2004
INVENTOR(S) : Nikolas Bergerhoff et al.

It is certified that error appears in the above-identified patent and that said Letters Patent is hereby corrected as shown below:

<u>Title page,</u>
Item [63], Related U.S. Application Data, insert the following paragraph:

-- This application claims priority to German Application No. 101 52 340 filed on October 24, 2001. --

Signed and Sealed this

Twentieth Day of April, 2004

JON W. DUDAS
*Acting Director of the United States Patent and Trademark Office*